(12) United States Patent
Wang et al.

(10) Patent No.: US 10,719,072 B2
(45) Date of Patent: Jul. 21, 2020

(54) METHOD AND APPARATUS FOR DIAGNOSIS AND RECOVERY OF SYSTEM PROBLEMS

(71) Applicant: EMC Corporation, Hopkinton, MA (US)

(72) Inventors: Tianqing Wang, Shanghai (CN); Feng Guo, Shanghai (CN); Lintao Wan, Shanghai (CN); Dong Xiang, Shanghai (CN); Qiyan Chen, Shanghai (CN); Tao Chen, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1157 days.

(21) Appl. No.: 14/058,511

(22) Filed: Oct. 21, 2013

(65) Prior Publication Data

US 2014/0114613 A1 Apr. 24, 2014

(30) Foreign Application Priority Data

Oct. 23, 2012 (CN) .......................... 2012 1 0417663

(51) Int. Cl.
*G05B 23/02* (2006.01)
*G06F 11/07* (2006.01)

(52) U.S. Cl.
CPC ........ *G05B 23/0205* (2013.01); *G06F 11/079* (2013.01); *G06F 11/0736* (2013.01); *G06F 11/0703* (2013.01); *G06F 11/0748* (2013.01)

(58) Field of Classification Search
CPC ................................................. G06F 11/3006

USPC ........... 702/55, 62, 119, 181, 185, 186, 188; 706/911; 709/203; 700/1
See application file for complete search history.

(56) References Cited

U.S. PATENT DOCUMENTS

| 5,123,017 A | * | 6/1992 | Simkins | ............ | G06F 11/3006 |
| | | | | | 706/911 |
| 5,983,364 A | * | 11/1999 | Bortcosh | ............ | G06F 11/2257 |
| | | | | | 714/25 |

(Continued)

FOREIGN PATENT DOCUMENTS

JP       2005228004 A    *    8/2005

*Primary Examiner* — John C Kuan
(74) *Attorney, Agent, or Firm* — Brian J. Colandreo; Mark H. Whittenberger; Holland & Knight LLP

(57) ABSTRACT

Embodiments of the present invention relate to method and apparatus for system problem diagnosis and recovery. According to embodiments of the present invention, problem symptom information in a system can be automatically monitored and collected BY a monitoring apparatus (or referred as to "agent") deployed at the system side. Upon after receiving such information, the diagnosis apparatus, for example, may automatically determine a root cause of the problem by querying a backend knowledge repository, and possibly generate an executable software package for recovering the problem. If the diagnosis apparatus determines that the currently available information is insufficient to determine a creditable enough root cause and/or is insufficient to generate the software package for recovering the problem, the diagnosis apparatus may interactively control the monitoring apparatus to collect desired additional information. In this way, the efficiency and accuracy of problem diagnosis and recovery may be improved.

16 Claims, 5 Drawing Sheets

(56) References Cited

U.S. PATENT DOCUMENTS

| | | | | |
|---|---|---|---|---|
| 6,138,249 | A * | 10/2000 | Nolet | G06F 11/008 |
| | | | | 714/25 |
| 6,311,326 | B1 * | 10/2001 | Shagam | G06F 11/3636 |
| | | | | 714/E11.21 |
| 6,615,376 | B1 * | 9/2003 | Olin | G06F 3/0481 |
| | | | | 714/57 |
| 7,577,701 | B1 * | 8/2009 | Johns | H04L 12/2602 |
| | | | | 709/203 |
| 8,645,756 | B1 * | 2/2014 | Lee | G06F 11/0784 |
| | | | | 714/26 |
| 2004/0128583 | A1 * | 7/2004 | Iulo | G06F 11/0709 |
| | | | | 714/25 |
| 2004/0187048 | A1 * | 9/2004 | Angamuthu | G06F 11/0727 |
| | | | | 714/27 |
| 2004/0254648 | A1 * | 12/2004 | Johnson | G05B 19/042 |
| | | | | 700/1 |
| 2005/0216785 | A1 * | 9/2005 | Suzuki | H04L 41/024 |
| | | | | 714/47.1 |
| 2006/0150008 | A1 * | 7/2006 | Srinivas | G06F 11/079 |
| | | | | 714/12 |
| 2009/0182794 | A1 * | 7/2009 | Sekiguchi | G06F 11/0748 |
| 2011/0178633 | A1 * | 7/2011 | Marrese | G06Q 10/08 |
| | | | | 700/229 |
| 2011/0276831 | A1 * | 11/2011 | Perelstein | G06F 11/0727 |
| | | | | 714/37 |
| 2013/0124908 | A1 * | 5/2013 | Gowin | G06F 11/0793 |
| | | | | 714/2 |

* cited by examiner

METHOD AND APPARATUS FOR DIAGNOSIS AND RECOVERY OF SYSTEM PROBLEMS

FIELD OF THE INVENTION

Embodiments of the present invention generally relate to the field of computer, and more specifically, to a method and apparatus for diagnosis and recovery of system problems.

BACKGROUND OF THE INVENTION

After a software and/or hardware system is developed and deployed, it is important to maintain the system. Generally speaking, system maintenance policies known at present may be categorized into two types, namely, manual approach and automatic approach.

Manual approaches rely on training and assigning professional technicians or experts who are responsible for resolving problems and maintaining specific software/hardware products. However, it usually consumes considerable time and cost to train an experienced professional with a higher level of skill. Statistics show that among the total time taken for detecting and resolving a system problem, about 60% of the time is spent on determining and identifying the problem. Even worse, statistics further show that among the root causes for problems as determined by a long-term communication between a user and a technician, above 95% problems have been encountered and resolved by other users or the user himself. It is clear that the manual approach for system maintenance and problem processing will cause waste in manpower, resources, and time.

Automatic approaches generally rely on a knowledge repository, for example, built on a server, which stores previously occurred problems and their solutions. However, most of such systems merely query the knowledge repository based on the initially collected problem symptoms and return the root causes as determined from the query as well as corresponding solutions to the user. However, the information which is collected immediately after a problem occurs may not suffice to determine the real root cause of the problem. For example, many different problems or exceptions possibly have same or similar symptoms during the initial stage. At this point, the diagnoses based on such initial symptoms may not lead to the exact root cause.

In fact, problems having the same symptoms in a software and/or hardware system might be caused by different root causes. For example, in a large-scale storage system, there are many factors that might cause the problem symptom "the user cannot access a particular storage array." On the other hand, the same root cause in the same system might cause different symptoms in different conditions and states. It is insufficient to determine a root cause for a problem simply based on initial symptoms.

Therefore, there is a need in the art for a more effective problem diagnosis and recovery solution.

SUMMARY OF THE INVENTION

In view of the above problems, embodiments of the present invention provide method and apparatus for diagnosis and recovery of system problem.

In a first aspect of the present invention, a monitoring apparatus for monitoring a problem in a monitoring system is provided. The monitoring apparatus comprises: a collecting unit configured to collect information on a symptom of the problem in the system; a transmitting unit configured to transmit the collected information to a diagnosis apparatus; and a receiving unit configured to receive from the diagnosis apparatus a command of collecting additional information on the problem and to cause the collecting unit to collect the additional information responsively.

In a second aspect of the present invention, a diagnosis apparatus for diagnosing a problem in a monitoring system is provided. The diagnosis apparatus comprises: a receiving unit configured to receive, from a monitoring apparatus deployed at a system side, information on a symptom in the system; an analyzing unit configured to analyze the received information to determine a root cause of the problem; and a control unit configured to communicate with the monitoring apparatus to control the monitoring apparatus to collect additional information on the problem in response to being unable to determine the root cause or a confidence of the determined root cause below a predetermined threshold.

In a third aspect of the present invention, a method for monitoring a problem in a monitoring system is provided. The method comprises: collecting information on a symptom of the problem in the system; transmitting the collected information to the diagnosis apparatus; and receiving from the diagnosis apparatus a command of collecting additional information on the problem and collecting the additional information responsively.

In a fourth aspect of the present invention, a method for diagnosing a problem in a diagnosing system is provided. The method comprises: receiving, from a monitoring apparatus deployed at a system side, information on a symptom in the system; analyzing the received information to determine a root cause of the problem; and communicating with the monitoring apparatus to control the monitoring apparatus to collect additional information on the problem in response to being unable to determine the root cause or a confidence of the determined root cause below a predetermined threshold.

It would be understood from the following description that according to embodiments of the present invention, information on problem symptoms in a system can be automatically monitored and collected by a monitoring apparatus (or referred to as "agent") deployed at the system side. Upon receiving such information, the diagnosis apparatus, for example, may automatically determine a root cause of the problem by querying a backend knowledge repository, and possibly generate an executable software package for recovering the problem. Specifically, if the diagnosis apparatus finds that the currently available information is insufficient to determine a creditable enough root cause and/or is insufficient to generate the software package, the diagnosis apparatus may interactively control the monitoring apparatus to collect desired additional information. In this way, the efficiency and accuracy of problem diagnosis and recovery may be improved.

BRIEF DESCRIPTION OF THE DRAWINGS

Through reading the following detailed description with reference to the accompanying drawings, the above and other objectives, features and advantages of embodiments of the present invention will become more comprehensible. In the drawings, several embodiments of the present invention will be illustrated in an exemplary and non-limiting manner, wherein.

Throughout the drawings, like reference symbols refer to same or similar parts.

DETAILED DESCRIPTION OF EMBODIMENTS

Figure 1:
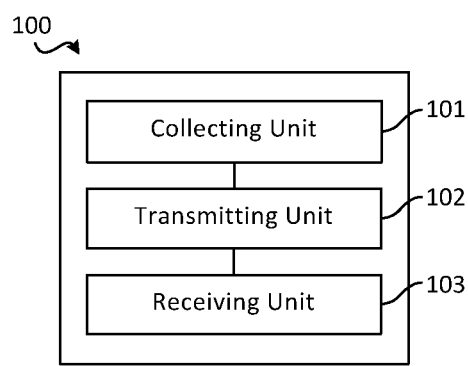
FIG. 1 illustrates a block diagram of a monitoring apparatus 100 for monitoring a problem in a system according to one exemplary embodiment of the present invention.

Hereinafter, the principle and spirit of the present invention will be described with reference to various exemplary embodiments illustrated in the drawings. It should be understood that provision of these embodiments is only to enable those skilled in the art to better understand and further implement the present invention, not intended for limiting the scope of the present invention in any manner.

According to embodiments of the present invention, problems in a system may be monitored and diagnosed in a distributed manner. Generally speaking, a monitoring apparatus may be deployed at the system side to monitor information on problems in the system. On the other hand, a problem diagnosis apparatus independent of the monitoring apparatus (for example, the problem diagnosis apparatus may be deployed at a backend server) may interact with the monitoring apparatus to diagnose and possibly recover the problems in the system.

Please note that the term "system" as used herein may refer to a hardware system or a software system, and the scope of the present invention is not limited in this aspect. The term "problem" as used herein refers to any errors, failures, exceptions that affect or potentially affect normal operation of the system. Further, the term "apparatus" as used herein may refer to either a device or a module configured based on hardware, or a module composed of software programs.

Reference is first made to FIG. 1, where a block diagram of a diagnosis apparatus 100 for diagnosing a problem in a system according to one exemplary embodiment of the present invention is shown. According to embodiments of the present invention, the apparatus may reside at a side of the system to be monitored. In particular, the "monitoring apparatus" here may also be considered as an "agent."

As shown in FIG. 1, according to embodiments of the present invention, the monitoring apparatus 100 comprises a collecting unit 101 configured to collect information on a symptom of the problem in the system. The term "symptom" here refers to a description of the appearance of the problem, i.e., the system behaviors or states caused by the problem. For example, the symptom information may include occurrence time of the problem, the system state at that moment, system behavior, system context, exceptions thrown by the system, and the like. Further, the problem symptom may also include information in a system configuration file, configuration information of the operating system (OS), hardware configuration information, network configuration information, and so on. What are described above are only some examples. The collecting unit 201 according to embodiments of the present invention is operable to collect any information related to the problem symptoms.

Specifically, the information of problem symptom may include information contained in logs associated with the system. It would be appreciated that a log is generally composed of a series of log items, each of which may include one or more fields for recording different types of information. For example, the table below shows a possible structure of a log item of a software system.

| Level | Time | Event | Description | Class | Source | Type |
|---|---|---|---|---|---|---|

It should be noted that the above structure is only exemplary, and any log structure for recording behaviors and problems of the software system should fall within the scope of the present invention. Moreover, in addition to the log information or as alternative, problem symptoms may be stored in any suitable forms. The scope of the present invention is not limited in this regard.

According to embodiments of the present invention, the collecting unit 101 in the monitoring apparatus 100, for example, may continuously collect various kinds of problem information at background. Alternatively, the collecting unit 101 may operate intermittently based on a predetermined period. Further, the collecting unit 101 may also be interactively enabled and disabled by a user of the system. The scope of the present invention is not limited in this regard.

As shown in FIG. 1, the monitoring apparatus 100 further comprises a transmitting unit 102 configured to transmit the collected information to the diagnosis apparatus. The diagnosis apparatus may reside remotely or locally to the system, as will be described in detail. The transmitting unit 102 may employ various suitable information communication techniques to communicate with the diagnosis apparatus.

For example, in an embodiment where the diagnosis apparatus is located remotely to the system, the transmitting unit 102 may transmit the problem symptom information collected by the collecting unit 101 to the diagnosis apparatus via a network communication. The network, for example, may be a wired network, a wireless network, or a combination thereof, including, but not limited to, at least one of the following: a cellular telephone network, Ethernet, a wireless local area network (WLAN) based on IEEE 802.11, 802.16, 802.20, and/or Worldwide Interoperability for Microwave Access (WiMAX) network. Further, the network may be a public network (such as, Internet), a private network (for example, an intra network within an enterprise), or a combination thereof. Through the above network, the transmitting unit 102 and the diagnosis apparatus may communicate based on various suitable protocols such as Syslog, SNMP and HTTPS. Alternatively or additionally, information communication may be realized by using mechanisms such as bus, cable, optical fiber, etc.

Furthermore, in embodiments where the diagnosis apparatus and the monitoring apparatus 100 reside in a same physical machine, the transmitting unit 102 may transmit the problem symptom information collected by the collecting unit 101 to the diagnosis apparatus via an internal communication mechanism in the machine, such as bus communication, inter-process communication, and the like. The scope of the present invention is not limited in this regard.

After the diagnosis apparatus receives the problem symptom information, the information may be analyzed to determine a root cause for the problem. Specifically, if the root cause cannot be determined or is determined with a relatively low confidence, then instead of simply returning a problem prompt or passively waiting for further actions of the monitoring apparatus, the diagnosis apparatus may voluntarily communicate with the monitoring apparatus to control or instruct the monitoring apparatus to collect additional information on the problem.

Accordingly, the monitoring apparatus 100 according to embodiments of the present invention comprises a receiving unit 103 configurable to receive from the diagnosis apparatus a command of collecting additional information on the problem and to cause the collecting unit 101 to collect the additional information responsively.

For example, in some embodiments, the diagnosis apparatus might be unable to determine the root cause of the problem based on the current problem symptom, because problems caused by different root causes might share the same symptom during the early period. Therefore, the diagnosis apparatus may issue a command to the receiving unit 103 to instruct the monitoring apparatus 100 to collect information on further symptoms of the problem. In these embodiments, the receiving unit 103 receives the command and informs the collecting unit 101 to operate correspondingly. The collecting unit 101 comprises a first collecting unit (not shown in the figure) configured to collect information on further symptoms of the problem in response to the command received by the receiving unit 103. The information as collected will be transmitted to the diagnosis apparatus by the transmitting unit 102.

Alternatively or additionally, for some relative complex problems, the diagnosis apparatus might be unable to completely automatically determine the root cause for a problem based on the information collected by the monitoring apparatus. In this event, it may be necessary to interactively obtain user input related to the problem. At this point, the diagnosis apparatus may issue a command to the receiving unit 103 to instruct the monitoring apparatus 100 to collect user input relevant to the problem. In these embodiments, the receiving unit 103 receives the command and informs the collecting unit 101 to operate correspondingly. The collecting unit 101 comprises a second collecting unit (not shown in the figure) configured to collect, in response to the command received by the receiving unit 103, user input related to the problem, for example, the user's description on the problem, description of relevant states in the system, human prediction of the root cause based on experience, and the like. According to embodiments of the present invention, the second collecting unit may utilize various interactive means to implement interaction with the user, for example, graphical user interface (GUI) and various kinds of associated controls (for example, text box, radio box, check box, drop-down list, etc.) or audio, video, and other multi-modality interaction mechanisms. The collected user input information will be transmitted to the diagnosis apparatus via the transmitting unit 102 to facilitate determining the root cause for the problem.

Alternatively or additionally, the root cause for the problem possibly cannot be accurately determined only based on problem symptom and/or user input. One solution is to guide the behaviors of the system and determine the root cause for the problem based on a reaction of the system. At this point, the diagnosis apparatus may transmit a command to the receiving unit 103 to instruct the monitoring apparatus 100 to execute one or more actions associated with the system and collect information on the result caused by the action(s). In these embodiments, the receiving unit 103 receives the command and informs the collecting unit 101 to operate correspondingly. The collecting unit 101 may comprise a third collecting unit (not shown in the figure) configured to execute, in response to the command received by the receiving unit 103, one or more actions associated with the system and collect information on the consequences induced by the action(s). According to embodiments of the present invention, the executed action(s) may be determined by the diagnosis apparatus. By executing these actions and collecting feedback from the system, it is possible to facilitate determining the root cause of the problem. For example, if the problem is that the system cannot be connected to the network, then the diagnosis apparatus may control the monitoring apparatus to send a request message to a network port and determine whether the network port currently works normally based on whether a response is obtained. The collected system feedback information will be transmitted to the diagnosis apparatus via the transmitting unit 102 so as to facilitate determining the root cause for the problem.

It would be appreciated that according to embodiments of the present invention, the collecting unit 101 may comprise one or more of the first, second, and third collecting units as described above. Moreover, the above description is only exemplary. According to embodiments of the present invention, the diagnosis apparatus may interactively control the monitoring apparatus 100 to collect any additional/auxiliary information on the system problem as needed, in order to determine the root cause of the problem. The scope of the present invention is not limited in this regard. Further, more than one round of the interaction may be performed between the monitoring apparatus and the diagnosing apparatus so as to obtain enough information for determining the root cause of the problem gradually.

According to some embodiments, the diagnosis apparatus, after determining the root cause, may generate a corresponding executable software package (for example, update package, patch package, etc.), which will be described in detail. In these embodiments, the monitoring apparatus 100 may comprise an optional recovery package executing unit (not shown in the figure) configurable to execute the executable software package for recovering the problem which is received from the diagnosis apparatus.

Specifically, upon determining the root cause for the problem, the diagnosis apparatus might find that the currently obtained information does not suffice to generate an executable software package. In other words, the information transmitted from the monitoring apparatus 100 to the diagnosis apparatus is sufficient to determine the root cause, but insufficient to recover the problem. In this event, the diagnosis apparatus may instruct the monitoring apparatus 100 to continuously collect additional information required to recover the problem. The commands may be received by the receiving unit 103, and the collecting unit 101 may act correspondingly. Specifically, the collecting unit 101 may comprise a fourth collecting unit (not shown in the figure) configurable to collect additional information required to generate the executable software package in response to the command received by the receiving unit 103 from the diagnosis apparatus. Such additional information, for example, may comprise the configuration of the physical machine where the system is located, software environment, OS environment, network environment, memory and/or processor utilization, etc. The collected additional information will be transmitted from the transmitting unit 102 to the diagnosis apparatus so as to generate the executable software package for recovering the problem.

In addition, according to some embodiments of the present invention, the monitoring apparatus 100 may further comprise a recovery feedback unit (not shown in the figure) configurable to transmit a recovery success message or a recovery failure message to the diagnosis apparatus based on whether the problem is successfully recovered by executing the executable software package. For example, if the collecting unit 101 still collects information on a problem symptom(s) after executing the executable software package, it may be deemed that the recovery action fails. At this point, the recovery feedback unit transmits a message indicating the recovery failure to the diagnosis apparatus. Optionally, the message may include specific parameters or data of the recovery failure. Correspondingly, the diagnosis apparatus may determine a cause for the failure based on the recovery failure message and instruct the monitoring apparatus to collect additional information so as to re-generate an executable software package for recovery, which will be detailed later.

Figure 2:
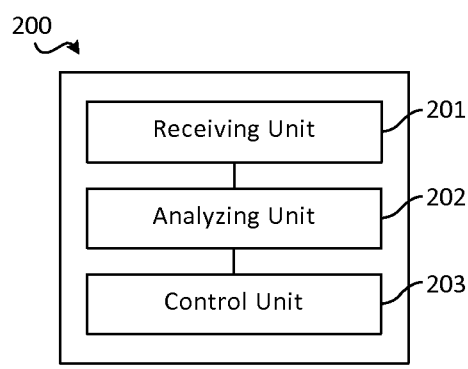
FIG. 2 illustrates a block diagram of a diagnosis apparatus 200 for diagnosing a problem in a system according to one exemplary embodiment of the present invention.

Several examples of the monitoring apparatus 100 according to embodiments of the present invention have been described with reference to FIG. 1. Reference will be made to FIG. 2 where a diagnosis apparatus 200 for diagnosing a system problem according to exemplary embodiments of the present invention is shown.

As shown in FIG. 2, according to embodiments of the present invention, the diagnosis apparatus 200 comprises a receiving unit 201 configured to receive, from a monitoring apparatus, information on a symptom of the problem in the system. Several examples of the symptom information have been provided above with reference to FIG. 1, which will not be detailed here.

According to some embodiments of the present invention, the receiving unit 201 may normalize the received symptom information such that the information has a normalized format to therefore facilitate subsequent operations. For example, an example of a normalized format may be [system type, system ID, time, log level (optional), name of module with occurrence of problem, exception name (optional), data . . . ]. It would be appreciated that it is merely exemplary, not intended to limit the protection scope of the present invention.

Continuing to refer to FIG. 2, the diagnosis apparatus 200 further comprises an analyzing unit 202 configurable to analyze the received information to determine a root cause of the problem. According to some embodiments, the analyzing unit 202 may analyze the received information based on rules. For example, a series of predetermined rules may be maintained at the diagnosis apparatus 200 side, indicating the correspondence between problem symptoms and root causes. These rules may be stored in any proper manner, for example, text file, formatted text, database, etc.

Alternatively or additionally, a problem knowledge repository accessible to the diagnosis apparatus 200 may be maintained. The knowledge repository may store information on at least one previous problem. For example, the knowledge repository may store symptoms, root causes and solutions for problems that occurred previously. According to some embodiments of the present information, the information in the knowledge repository may be generated, inputted, or controlled a series of predetermined rules. Alternatively or additionally, data mining and training methods may be utilized to manage the knowledge repository. For example, based on relevant information of a previously occurring problem, various currently known or future developed techniques may be utilized to train the knowledge repository to thereby obtain "symptom-root cause" and "root cause-solution" mapping. In this aspect, a general training process may comprise the following main phases: data selection; pre-processing; transform; data mining, and interpretation/evaluation. Examples of the data mining techniques may comprise: association rule, cluster analysis, semi-super learning, data classification technology, etc. The scope of the present invention is not limited in this regard.

In these embodiments, the analyzing unit 202 may comprise a knowledge repository query unit (not shown in the figure) configurable to query the knowledge repository using the received information to determine a root cause of the problem. For example, the knowledge repository query unit may utilize the deductive reasoning technique to execute the analysis process so as to find a root cause for the problem in the knowledge repository based on the symptom(s). Another possible approach is using a complex event processing (CPE) technique to determine a corresponding high-level event (for example, root cause for the problem) based on a low-level event (for example, problem symptom). Various kinds of other schemes such as neural network and Bayesian network may also be used to determine the root cause of the problem based on the problem symptom.

Moreover, according to some embodiments of the present invention, the knowledge repository may be updatable. In these embodiments, the diagnosis apparatus 200 may comprise a knowledge repository updating unit (not shown in the figure) configurable to add information on the root cause of the problem and the symptom into the knowledge repository if the determined root cause is not present in the knowledge repository. If the analysis unit 202 cannot locate a root cause of the problem matching the symptom in the knowledge repository, it may turn to a human expert. The root cause determined by the expert may be fed to the knowledge repository for the training and learning of the knowledge repository to thereby update the knowledge.

Continuing to refer to FIG. 2, the diagnosis apparatus 200 further comprises a control unit 203 configurable to communicate with the monitoring apparatus so as to control the monitoring apparatus to collect additional information on the problem in response to being unable to determine the root cause or the confidence of the determined root cause below a predetermined threshold. Specifically, if the analyzing unit 202 cannot determine the root cause of the problem based on the information currently received from the monitoring apparatus, or although the root cause for the problem has been determined, the confidence of the root cause as returned by the DE or CPE procedure is below a predetermined threshold (i.e., although it may be deemed that a root cause matching the symptom exists, such matching degree is relative weak), the diagnosis apparatus 200 may utilize the control unit 203 to instruct the monitoring apparatus to collect additional information instead of directly turning to a human expert. Actually, sometimes even the human expert cannot accurately determine the root cause for the problem from the currently collected information, and more information needs to be collected to determine the root cause.

As above mentioned with reference to FIG. 1, the collected additional information may include one or more of the following: information on further symptoms of the problem, user input about the problem, information on the consequences obtained by executing one or more actions by the monitoring apparatus, and the like. Accordingly, according to embodiments of the present invention, the control unit 203 may comprise at least one of the following: a first control unit configurable to control the monitoring apparatus to collect information on a further symptom(s) of the problem; a second control unit configured to control the monitoring apparatus to collect user input relevant to the problem; and a third control unit configured to control the monitoring apparatus to execute one or more actions in the system and collect information on the consequences induced by the action(s).

In some embodiments, the diagnosis apparatus 200 may further comprise a recovery package generating unit (not shown in the figure) configurable to generate an executable software package for recovering the problem based on the determined root cause and transmit the executable software package to the monitoring apparatus for execution in the system. Specifically, it would be appreciated that in some cases, the information obtained from the monitoring apparatus is already enough to determine the root cause of the problem, but not enough to generate a software package needed to recover the problem. Therefore, in some embodiments, the control unit 203 may comprise a fourth control unit configurable to communicate, in response to the received information being insufficient to generate the executable software package, with the monitoring apparatus to control the monitoring apparatus to collect additional information required to generate the executable software package.

As described above, in case that the monitoring apparatus executes the executable package generated by the recovery package generating unit but fails to successfully recover the problem, the monitoring apparatus may send a recovery failure message to the diagnosis apparatus 200. Accordingly, according to some embodiments of the present invention, the control unit 203 may comprise a fifth control unit configured to communicate, in response to receiving the recovery failure message from the monitoring apparatus, with the monitoring apparatus to control the monitoring apparatus to collect additional information on the problem. As described above, in the recovery failure message from the monitoring apparatus, it may comprise specific parameters, details, and data regarding the recovery. Therefore, the fifth control unit may determine what additional information is further required to completely recover the problem and instruct the monitoring apparatus to collect such information.

It would be appreciated that the recovery failure may be caused by incorrectly determined root cause for the problem, or improper or incomplete recovery action, or both. Correspondingly, the fifth control unit may instruct the monitoring apparatus to collect additional information needed for determining a correct root cause and/or additional information required to generate the recovery package.

It is seen from the above description that through deploying and using the monitoring apparatus 100 and diagnosis apparatus 200 which have been described above with reference to FIG. 1 and FIG. 2, respectively, information on the problem in a system may be automatically collected, and the root cause for the problem can be effectively determined Optionally the problem may be automatically recovered. Specifically, the diagnosis apparatus may dynamically perform one or more interactions with the monitoring apparatus as required in the diagnosis and/or recovery, so as to collect enough information to implement problem diagnosis and recovery.

It should be noted that according to embodiments of the present invention, the monitoring apparatus 100 and the diagnosis apparatus 200 may be implemented in various manners. For example, in some embodiments, the monitoring apparatus 100 and the diagnosis apparatus 200 may be implemented using software and/or firmware modules. Alternatively or additionally, the monitoring apparatus 100 and the diagnosis apparatus 200 may be implemented partially or completely based on hardware. For example, the monitoring module 100 and the diagnosis apparatus 200 may be implemented as an integrated circuit (IC) chip or dedicated integrated circuit (ASIC). The monitoring apparatus 100 and the diagnosis apparatus 200 may be implemented as a system-on-chip (SOC). Other manners that are currently known or developed in the future are also feasible, and the scope of the present invention is not limited in this regard.

Figure 3:
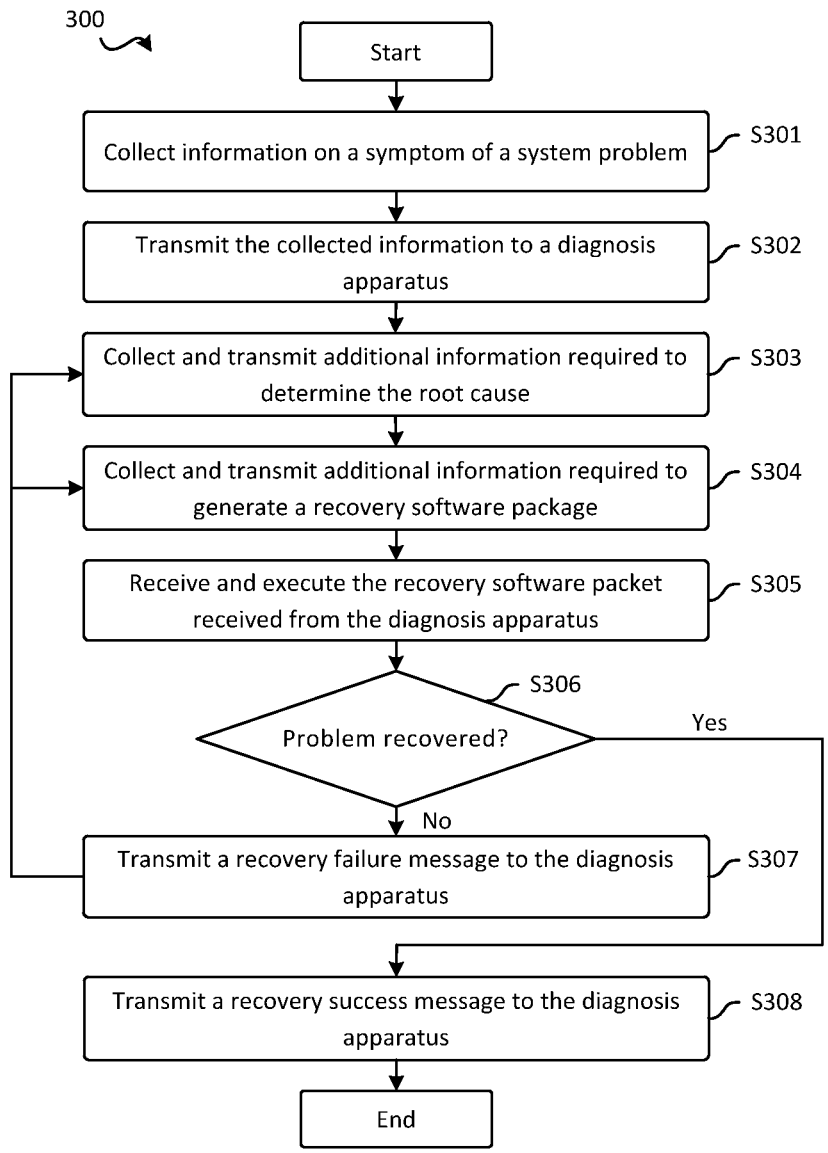
FIG. 3 illustrates a flowchart of a method 300 for monitoring a problem in a system according to one exemplary embodiment of the present invention.

Now referring to FIG. 3, a flowchart of a method 300 for monitoring a problem in a system according to one exemplary embodiment of the present invention is shown. The method 300 may be executed by the monitoring apparatus 100 described above.

As shown in FIG. 3, after the method 300 starts, information on a symptom of the problem in the system is collected at step S301. Next, the collected information may be transmitted to a diagnosis apparatus at step S302.

The method 300 then proceeds to step S303, where a command of collecting additional information on the problem is collected from the diagnosis apparatus, and responsively, the additional information is collected to be transmitted to the diagnosis apparatus. According to some embodiments of the present invention, collecting additional information may comprise one or more of the following: collecting information on a further symptom(s) of the problem in response to the command received from the diagnosis apparatus; collecting user input relevant to the problem in response to the command received from the diagnosis apparatus; and executing one or more actions in the system and collecting information on consequences induced by the action(s) in response to the command received from the diagnosis apparatus.

According to some embodiments of the present invention, the method 300 may proceed to an optional step S304, where in response to the command received from the diagnosis apparatus, additional information required to generate an executable software package for recovering the problem is collected for transmission to the diagnosis apparatus. Next, at step S305, the executable software package for receiving the problem as received from the diagnosis apparatus may be executed.

Then, it is determined at step S306 whether the problem has been successfully recovered through executing the executable software package. If not (branch "No"), the method 300 proceeds to step S307 where a recovery failure message is transmitted to the diagnosis apparatus. Next, in view of the specific reason for the recovery failure, the diagnosis apparatus may instruct the monitoring apparatus to continuously collect additional information for determining the root cause and/or additional information for generating a correct recovery package. Correspondingly, the method 300 may return to step S303 and/or S304 to continue.

On the other hand, if it is determined at step S306 that the problem has been successfully recovered through executing the recovery software package (branch "Yes"), then the method 300 proceeds to step S308 where a recovery success message is transmitted to the diagnosis apparatus, and the method 300 ends. It should be noted that the "end" here is in logical sense. In practice, the monitoring apparatus may return to step S301 to continuously monitor any problem in the system.

Figure 4:
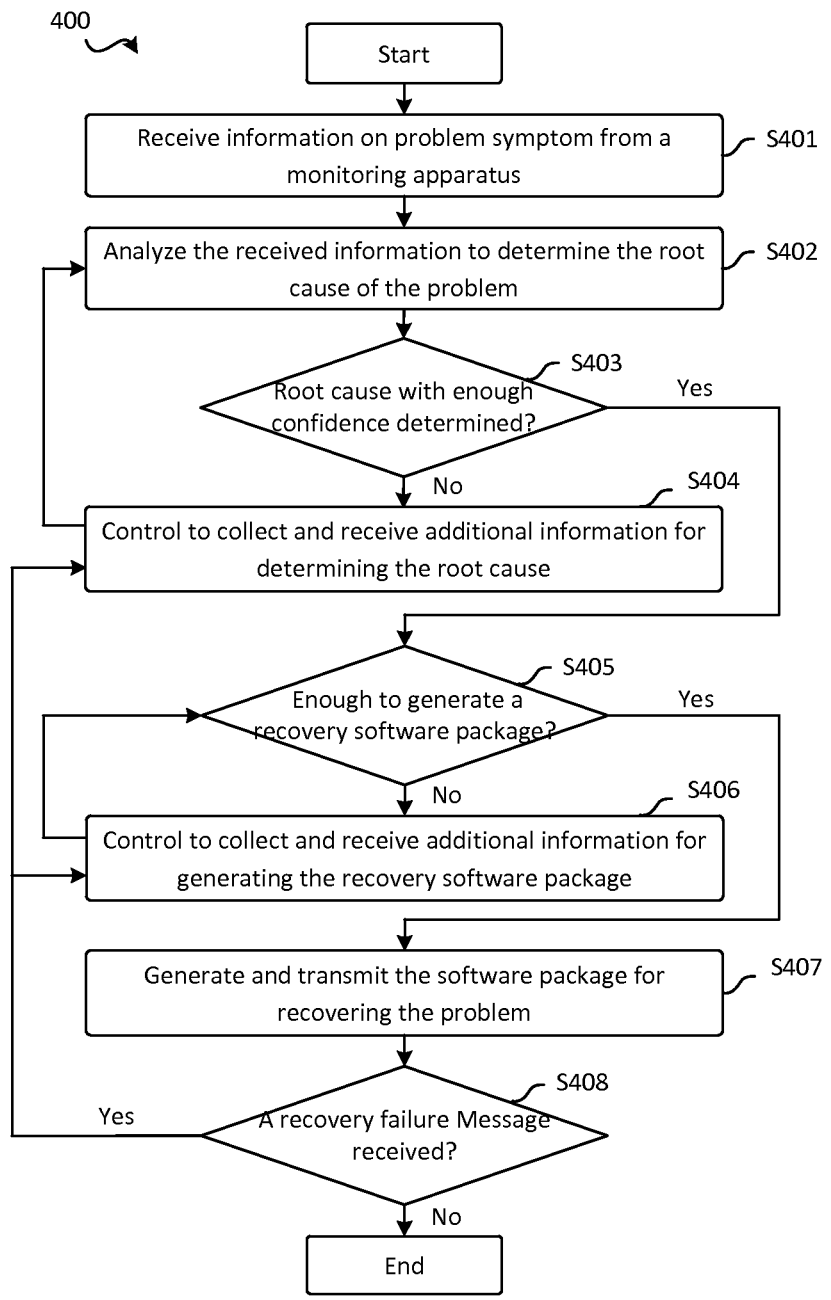
FIG. 4 illustrates a flowchart of a method 400 for diagnosing a problem in a system according to one exemplary embodiment of the present invention.

Reference is now made to FIG. 4, where a flowchart of a method 400 for diagnosing a problem in a system according to one exemplary embodiment of the present invention is shown. The method 400 may be executed by the diagnosis apparatus 200 described above.

As shown in FIG. 4, after the method 400 starts, information on the problem in the system is received at step S401 from a monitoring apparatus deployed at the system side. Next, the method 400 proceeds to step S402 where the received information is analyzed to determine a root cause of the problem. According to some embodiment, it may comprise querying a knowledge repository using the received information to determine the root cause of the problem, the knowledge repository storing information on at least one previous problem. Optionally, in these embodiments, information on the problem may be added into the knowledge repository in response to the determined root cause being not present in the knowledge repository.

The method 400 then proceeds to step S403, where it is determined whether a root cause whose confidence is higher than a predetermined threshold. In response to being unable to determine the root cause or the confidence of the determined root cause below the predetermined threshold (branch "No"), the method 400 proceeds to step S404, where the diagnosis apparatus communicates with the monitoring apparatus to control the monitoring apparatus to collect additional information on the problem and receive the information. For example, according to some embodiments, at least one of the following may be performed at step S404: controlling the monitoring apparatus to collect information on a further symptom of the problem; controlling the monitoring apparatus to collect user input relevant to the problem; and controlling the monitoring apparatus to execute one or more actions in the system and collect information on the consequences induced by the action(s). Then, the method 400 returns to step S402 to continuously analyze the root cause of the problem.

On the other hand, if a root cause for the problem with a high enough confidence has been determined at step S403 (branch "Yes"), then the optional step S405 may be executed to determine whether the currently available information is enough to generate an executable software package for recovering the problem. If not, the method 400 proceeds to step S406 where the diagnosis apparatus communicates with the monitoring apparatus to control the monitoring apparatus to collect additional information needed for generating the executable software package. On the other hand, if it is determined at step S405 that the currently available information is enough to generate the executable software package for recovery, the method 400 proceeds to step S407 where the executable software package for recovering the problem is generated and the executable software package is transmitted to the monitoring apparatus for execution.

Optionally, the method 400 proceeds to step S408 where it is determined whether a recovery failure message is received from the monitoring apparatus. If yes, the diagnosis apparatus may determine the cause for the failure based on the specific parameters and data contained in the recovery failure message, for example, the determined root cause is wrong, and/or the generated recovery package is problematic. Correspondingly, the method 400 may return to step S404 and/or 406, where the diagnosis apparatus communicates with the monitoring apparatus to control the monitoring apparatus to collect corresponding additional information needed for recovering the problem.

If no recovery failure message is received from the monitoring apparatus, the method 400 ends after step S408. It should be noted that the "end" here is in logical sense. In practice, the diagnosis apparatus may return to step S401 to continuously diagnose any problem in the system.

It would be appreciated that all features as above described with reference to FIGS. 1 and 2 are applicable to method 300 and method 400, respectively, which will not be detailed here.

Figure 5:
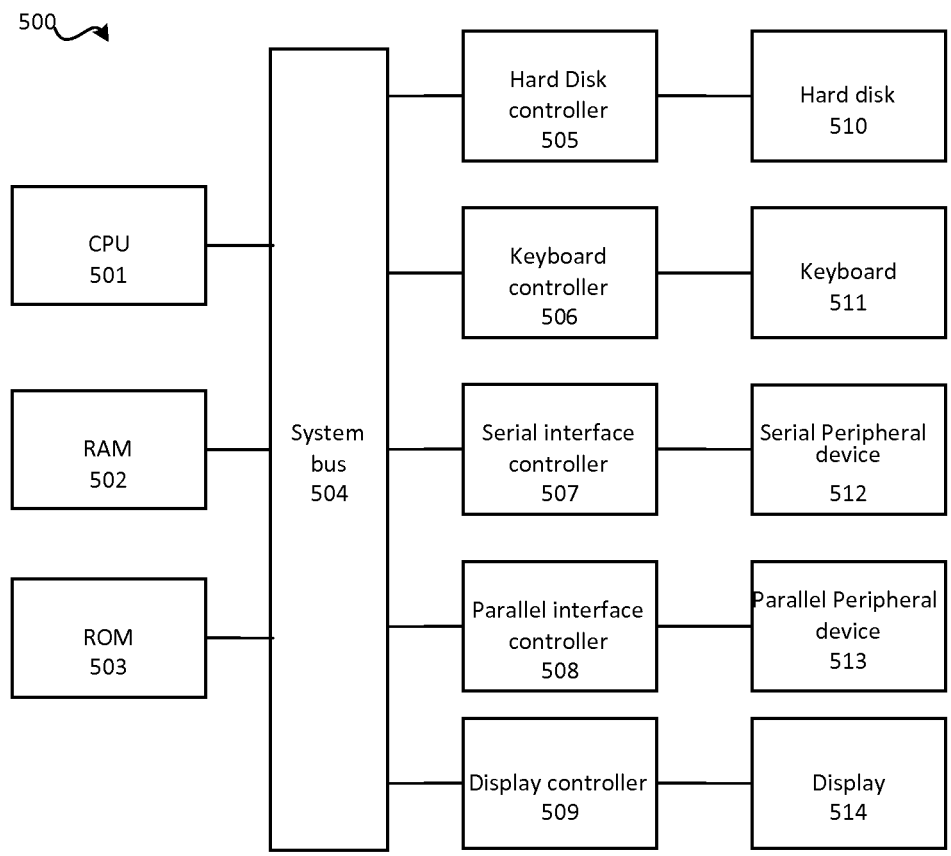
FIG. 5 illustrates a block diagram of a computer 500 which is applicable to implement embodiments of the present invention.

FIG. 5 shows a schematic block diagram of a computer 500 that is adapted to implement embodiments of the present invention. As shown in the figure, the computer system as shown in the figure includes a CPU (Central Processing Unit) 501, a RAM (Random Access Memory) 502, a ROM (Read Only Memory) 503, a system bus 504, a hard disk controller 505, a keyboard controller 506, a serial interface controller 507, a parallel interface controller 508, a monitor controller 509, a hard disk 510, a keyboard 511, a serial peripheral device 512, a parallel peripheral device 513 and a monitor 514. Among these components, connected to the system bus 504 are the CPU 501, the RAM 502, the ROM 503, the hard disk controller 505, the keyboard controller 506, the serial interface controller 507, the parallel interface controller 508 and the monitor controller 509. The hard disk 510 is coupled to the hard disk controller 505; the keyboard 511 is coupled to the keyboard controller 506; the serial peripheral device 512 is coupled to the serial interface controller 507; the parallel peripheral device 513 is coupled to the parallel interface controller 508; and the monitor 514 is coupled to the monitor controller 509. It should be understood that the structural block diagram in FIG. 5 is shown only for illustration purpose, and is not intended to limit the scope of the present invention. In some cases, some devices may be added or reduced as required.

As above mentioned, the monitoring apparatus 100 and the diagnosis apparatus 200 may be implemented through hardware, for example, chip, ASIC, SOC, etc. Such hardware may be integrated into the computer system 500. Besides, embodiments of the present invention may also be implemented in a form of a computer program product. For example, the method 300 and method 400 as described with reference to FIG. 3 and FIG. 4 may be implemented via a computer program product. Such computer program product may be stored in RAM 504, ROM 504, hard disk 510 and/or any suitable storage medium as illustrated in FIG. 5, or downloaded to the computing system 500 from a suitable location in the network. The computer program product may comprise a computer code portion comprising a program instruction that may be executed through a suitable processing device (for example, CPU 501 in FIG. 5). The program instruction at least may comprise an instruction for implementing steps of the methods 300 and 400.

It should be noted that, embodiments of the present invention can be implemented in software, hardware or the combination thereof. The hardware part can be implemented by a special logic; the software part can be stored in a memory and executed by a proper instruction execution system such as a microprocessor or a design-specific hardware. The normally skilled in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their components in the present invention may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or sub-units of the apparatuses have been mentioned in the above detailed depiction, such partitioning is merely non-compulsory. In actuality, according to embodiments of the present invention, the features and functions of the above described two or more units may be embodied in one unit. In turn, the features and functions of the above described one unit may be further embodied in more units.

Besides, although operations of the present methods are described in a particular order in the drawings, it does not require or imply that these operations must be performed according to this particular sequence, or a desired outcome can only be achieved by performing all shown operations. On the contrary, the execution sequences for the steps as depicted in the flowcharts may be varied. Additionally or alternatively, some steps may be omitted, a plurality of steps may be merged into one step, or a step may be divided into a plurality of steps for execution.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A monitoring apparatus, including one or more processors and memory, for monitoring a problem in a system, the monitoring apparatus comprising:
    a collecting unit configured to collect information on a symptom of the problem in the system, wherein the symptom is enabled to be an activity of the system while affected by the problem;
    a transmitting unit, in communication with the collecting unit and a diagnosis apparatus, configured to transmit the collected information to the diagnosis apparatus; and
    a receiving unit, in communication with the collecting unit, configured to receive from the diagnosis apparatus one or more commands indicating what types of data to collect from the system;
    wherein the receiving unit is enabled to receive a recovery package enabled to act upon the system to resolve the problem;
    wherein the diagnosis apparatus is enabled to send the receiving unit the one or more commands indicating what types of data to collect;
    wherein the collecting unit comprises:
        a first collecting unit configured to collect the information on the symptom of the problem in the system;
        a second collecting unit configured to execute, in response to the one or more commands received by the receiving unit from the diagnosis apparatus, at least one action including sending a request message to a portion of the system to determine if the portion of the system is working normally based upon, at least in part, whether a response is obtained and collect information on at least one consequence induced by the at least one action, wherein the request message includes a request for user input, wherein the user input includes a user's description of the problem, a description of at least one state in the system, and a prediction of a root cause of the problem by a user, and
        a third collecting unit configured to collect, in response to the one or more commands received by the receiving unit from the diagnosis apparatus and in response to determining that the collected information collected by one or more of the first collecting unit and the second collecting unit is insufficient to recover the problem in the system, additional information required to generate an executable software package for recovering the problem for transmission to the diagnosis apparatus by the transmitting unit.

2. The monitoring apparatus according to claim 1, wherein the collecting unit comprises:
    a fourth collecting unit configured to collect information on a further symptom of the problem in response to the one or more commands received by the receiving unit from the diagnosis apparatus.

3. The monitoring apparatus according to claim 1, further comprising:
    a recovery package executing unit configured to execute an executable software package for recovering the problem, the executable software package being received from the diagnosis apparatus.

4. The monitoring apparatus according to claim 3, further comprising:
    a recovery feedback unit configured to transmit a recovery success message or a recovery failure message to the diagnosis apparatus based on whether the problem is recovered by executing the executable software package.

5. A diagnosis apparatus, including one or more processors and memory, for diagnosing a problem in a system, the diagnosis apparatus comprising:
    a receiving unit configured to receive information on a symptom of the problem in the system from a monitoring apparatus deployed at the system, wherein the symptom is enabled to be an activity of the system;
    a transmitting unit configured to send one or more commands indicating what types of data to collect;
    an analyzing unit, in communication with the receiving unit, configured to analyze the received information to determine a root cause of the problem; and
    a control unit, in communication with the receiving unit and the analyzing unit, configured to communicate with the monitoring apparatus to control the monitoring apparatus to collect additional data related to the problem in response to being unable to determine the root cause or a confidence of the determined root cause below a predetermined threshold;
    a recovery package generating unit in communication with the control unit and the analyzing unit, wherein the recovery package generating unit is enabled to provide a recovery package enabled to act upon the system to resolve the problem;
    wherein the control unit comprises:
        a first control unit configured to control the monitoring apparatus to execute at least one action including sending a request message to a portion of the system to determine if the portion of the system is working normally based upon, at least in part, whether a response is obtained and collect information on at least one consequence induced by the at least one action, wherein the request message includes a request for user input, wherein the user input includes a user's description of the problem, a description of at least one state in the system, and a prediction of a root cause of the problem by a user, and a second control unit configured to communicate with the monitoring apparatus and, in response to determining that the collected information collected by the first control unit is insufficient to recover the problem in the system, to control the monitoring apparatus to collect additional information required to generate an executable software package for recovering the problem in response to the received information being insufficient to generate the executable software package.

6. The diagnosis apparatus according to claim 5, wherein the control unit comprises:
a third control unit configured to control the monitoring apparatus to collect information on a further symptom of the problem.

7. The diagnosis apparatus according to claim 5, wherein the analyzing unit comprises:
a knowledge repository query unit configured to query a knowledge repository using the received information to determine the root cause of the problem, the knowledge repository storing information on at least one previous problem.

8. The diagnosis apparatus according to claim 7, further comprising:
a knowledge repository updating unit configured to add information on the problem into the knowledge repository in response to the determined root cause being not present in the knowledge repository.

9. The diagnosis apparatus according to claim 5, wherein the recovery package generating unit configured to generate an executable software package for recovering the problem based on the determined root cause and to transmit the executable software package to the monitoring apparatus for execution.

10. The diagnosis apparatus according to claim 9, wherein the control unit comprises:
a fourth control unit configured to communicate with the monitoring apparatus to control the monitoring apparatus to collect additional information on the problem in response to receiving a recovery failure message from the monitoring apparatus.

11. The diagnosis apparatus according to claim 5, wherein the monitoring apparatus and the diagnosis apparatus are each implemented as an integrated circuit (IC) chip.

12. The diagnosis apparatus according to claim 5, wherein the monitoring apparatus and the diagnosis apparatus are each implemented as an application-specific integrated circuit (ASIC).

13. A method for monitoring a problem in a system using a monitoring apparatus, the method comprising:
collecting, using the monitoring apparatus, information on a symptom of the problem in the system, wherein the symptom is enabled to be an activity of the system;
transmitting, via the monitoring apparatus, the collected information to a diagnosis apparatus; and
receiving from the diagnosis apparatus one or more commands of collecting additional information on the problem
wherein the diagnosis apparatus is enabled to send the receiving unit the one or more commands indicating what types of data to collect;
wherein the system is enabled to process a recovery package enabled to act upon the system to resolve the problem;
wherein collecting the additional information comprises:
executing, in response to the one or more commands received from the diagnosis apparatus, at least one action including sending a request message to a portion of the system to determine if the portion of the system is working normally based upon, at least in part, whether a response is obtained and collect information on at least one consequence induced by the at least one action, wherein the request message includes a request for user input, wherein the user input includes a user's description of the problem, a description of at least one state in the system, and a prediction of a root cause of the problem by a user, and
collecting, in response to the one or more commands received from the diagnosis apparatus and in response to determining that the collected information from the monitoring apparatus is insufficient to recover the problem in the system, additional information required to generate an executable software package for recovering the problem for transmission to the diagnosis apparatus.

14. The method according to claim 13, wherein collecting the additional information comprises:
collecting information on a further symptom of the problem in response to the one or more commands received from the diagnosis apparatus.

15. The method according to claim 13, further comprising:
executing an executable software package for recovering the problem, the executable software package being received from the diagnosis apparatus.

16. The method according to claim 15, further comprising:
transmitting a recovery success message or a recovery failure message to the diagnosis apparatus based on whether the problem is recovered by executing the executable software package.

* * * * *